| United States Patent [19] | [11] | 4,070,332 |
|---|---|---|
| Morikawa et al. | [45] | Jan. 24, 1978 |

[54] FLAME RETARDANT, NON-DRIPPING, SHAPE-RETAINING POLYESTER MOLDING COMPOSITION

[75] Inventors: Masanobu Morikawa; Toshikazu Aoyama; Miyoji Yada, all of Nagoya, Japan

[73] Assignee: Toray Industries, Inc., Tokyo, Japan

[21] Appl. No.: 740,534

[22] Filed: Nov. 10, 1976

[30] Foreign Application Priority Data

Nov. 18, 1975 Japan .................. 50-37758

[51] Int. Cl.² ............... C08K 3/22; C08K 5/03
[52] U.S. Cl. ............... 260/40 R; 260/45.75 R; 260/DIG. 24
[58] Field of Search ........... 260/45.75 R, DIG. 24, 260/40 R

[56] References Cited

U.S. PATENT DOCUMENTS

| 3,676,362 | 7/1972 | Yates | 260/45.75 R X |
|---|---|---|---|
| 3,751,396 | 8/1973 | Gall | 260/40 R |
| 3,824,209 | 7/1974 | Anderson | 260/45.9 R |
| 3,833,685 | 9/1974 | Wambach | 260/DIG. 24 |
| 3,869,420 | 3/1975 | Mathis et al. | 260/45.75 R |

*Primary Examiner*—Sandra M. Person
*Attorney, Agent, or Firm*—Miller & Prestia

[57] ABSTRACT

A flame retardant, non-dripping, shape-retaining thermoplastic polyester resin is disclosed comprising (a) a linear polyester, (b) a halogenated aromatic compound, (c) a zirconium compound, preferably in combination with antimony trioxide, and (d) a fibrous reinforcing agent.

12 Claims, No Drawings

FLAME RETARDANT, NON-DRIPPING, SHAPE-RETAINING POLYESTER MOLDING COMPOSITION

BRIEF SUMMARY OF THE INVENTION

The present invention relates to a moldable thermoplastic polyester resin having flame-retardant, non-dripping and shape-retention properties, which may be molded by conventional molding methods such as extrusion molding, injection molding and press molding.

Thermoplastic polyesters, such as polyethylene terephthalate and polybutylene terephthalate, are highly desirable for use as engineering plastics and as raw materials for mechanical parts for various machines, electrical equipment and parts for automobiles, for example. Because of their excellent heat-resistance and their high durability under thermal degradation, these synthetic resins are highly suitable for such uses. However, if these polyesters could be provided with effective flame-proofing properties, the practical usage of such thermoplastic polyester resins would be greatly extended.

In applying a flame-retarding agent to a base polyester polymer, the original physical properties (such as shape retention) of the base polymer generally deteriorate, thus interfering with the desirability and use of the polymer. Also, the resulting flame-retardant polyester resin usually has a tendency to drip while burning, and this is difficult to prevent even with fibrous reinforcement.

Shape retention of a molded article during burning is necessary, particularly when used, for example, to enclose a high energy system such as the high voltage section of a television receiver in order to prevent any spread of fire. Reduction of dripping is needed to prevent the ignition of other molded articles by the flaming particles within the molded article.

Several methods have been proposed with reference to glass reinforced polyester resins. For example, in U.S. Pat. No. 3,833,535 the use of fumed colloidal silica is disclosed. In U.S. Pat. No. 3,833,396, a blend of supplementary reinforcing agent such as asbestos fiber or whiskers is disclosed. These methods, however, are limited to the concept of preventing dripping of the flaming particles. In these methods, the structural integrity of the burning articles is not satisfactorily enhanced and the fine fibers and powder are difficult to handle in production.

Accorringly, it is an object of the present invention to provide a non-dripping, flame-retardant thermoplastic polyester resin for use in molding, which resin has excellent shape retention properties during burning, and which resin may be safely and easily handled during the production process.

Other objects and advantages of the present invention will become more readily apparent from the following detailed description and examples, which are intended to be illustrative and are not intended to limit the scope of the invention as defined in the appended claims.

DETAILED DESCRIPTION OF THE INVENTION

The term "zirconium compound" as used herein is defined as a mixture or compound containing zirconium oxide components, a typical example of which is zirconium dioxide. The content of the zirconium dioxide in the zirconium oxides is about 60 to 100% by weight.

Thermoplastic polyester molding resins of the present invention are prepared by blending about 5 – 25 parts by weight of a halogenated aromatic compound and about 1 – 20 parts by weight and preferably about 3 – 15 parts by weight of a zirconium compound with about 100 parts by weight of a high molecular weight linear polyester, preferably in combination with antimony trioxide, to improve the flame-retarding properties of the polyester resin, and preferably with the addition of reinforcing fibers such as glass fibers or asbestos to enhance the non-dripping properties of the product during burning. The linear aromatic polyester in accordance with this invention comprises at least one dicarboxylic acid component selected from the group consisting of terephthalic acid; 2,6-naphthalene dicarboxylic acid; and 1,2-bis(4-carboxyphenoxy)ethane, and at least one diol component containing an aliphatic diol having 2 to 6 carbon atoms. Examples of thermoplastic polyesters utilized in the present invention are polyethylene terephthalate, polyhexamethylene terephthalate, polyethylene-2, 6-naphthalate; polybutylene-2, 6-naphthalate; polyhexamethylene-2, 6-naphthalate; poly-1, 4-cyclohexylene dimethylene terephthalate; poly-1, 4-cyclohexylene dimethylene terephthalate/isophthalate copolymer; and copolyesters derived from biphenol A, terephthalic acid or isophalic acid, polyethylene benzoate or polyethylene-bis ($\alpha$-$\beta$-phenoxy) ethane-4, 4'-carboxylate. Among these, polyethylene terephthalate and polybutylene terephthalate are preferred.

The above polyesters may be modified for purposes of this invention by replacing a maximum of about 30 mol% of the main dicarboxylic acid or diol components with other copolymerizable dicarboxylic acids or diols respectively, and a blend containing more than about 70% by weight of these polyesters and not more than about 30% by weight of other organic polyesters may be used in accordance with the present invention.

The incorporation into the polyester of a halogenated aromatic compound together with a zirconium compound as a flame retarding agent is essential in the practice of the present invention, with the aromatic compound being selected from the following groups:

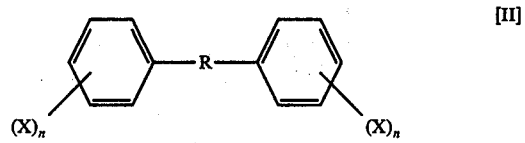

[I]

wherein R represents oxygen, sulfur dioxide, carbon dioxide, methylene, or phosphonates; X represents hydrogen, chlorine, or bromine with at least one chlorine or bromine; and $n$ is 1 – 5

For example, hexabromobiphenyl ether, hexabromobiphenylsulfone, or decarbromobiphenyl ether and the like may be used,

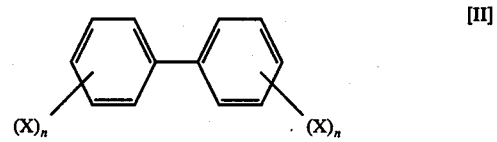

[II]

wherein X represents hydrogen, chlorine, or bromine with at least one chlorine or bromine; and $n$ is 1 – 5

For example, hexachlorobiphenyl, hexabromobiphenyl, or decarbromobiphenyl may be used.

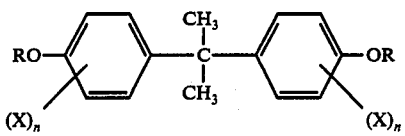

wherein R represents hydrogen, acetate, or alkyl; X represents hyrogen, chlorine, or bromine with at least one chlorine or bromine; and $n$ is 1 - 5

For example, 2,2-bis(3,5-dibromo 4-hydroxyphenol)-propane, 2,2-bis(3,5-dichloro 4-hydroxyphenyl)propane, 2,2-bis(3,5-dibromo 4-acetoxyphenyl)propane may be used.

An oligomer obtained from the reaction of epichlorohydorin, phosgene or diacidachloride with a compound from group III above, wherein at least one of R is hydrogene, may also be used in the present invention.

In the present invention a zirconium compound, preferably a powdered zirconium dioxide is employed. Other zirconium compounds which contain a significant zirconium oxide content may be used. These include calcined products obtained by calcination of zirconium hydroxide, ammonium zirconate, titanium zirconate, calcium zirconate, and/or zinc or other metallic zirconates. Such calcination products are deemed to be solid solutions of metal oxide (such as titanium dioxide, calcium oxide or zinc oxide, for example) mutually dissolved with zirconium dioxide mixtures of powders of the oxides may be substituted for such solid solutions, but in any event the percentage of zirconium dioxide should be about 60-100% by weight.

The amount of the zirconium compound is about 1-20% by weight, preferably 3-15% by weight, based on the weight of the thermoplastic polyester. When the amount of zirconium compound is less, the composition does not adequately control the dripping of the flaming particles during burning. On the other hand, when the amount of zirconium compound is above the indicated upper limit, the mechanical properties of the composition have been found to deteriorate.

For use in the present invention, antimony trioxide is preferably used as an auxiliary flame retarding agent in combination with the aforementioned zirconium compound. The antimony compound is preferably provided in an amount of about 1 - 20 parts by weight per 100 parts polyester by weight. To give sufficient flame retardance to the thermoplastic polyester composition, the use of more than about 1 part by weight of antimony trioxide is preferable. The use of more than the indicated upper limit of antimony trioxide results in deterioration of the mechanical properties of the composition.

Antimony trioxide may be used independently in combination with the zirconium compound or they may be simply mixed in the form of a mixed powder; however, a solid-solution of zirconium oxide with antimony oxide commercially available as "Fire DTC" or "Fire DTA" (trade name of Daiichi Kigenso Co., Japan) powder comprising about 40-80% by weight zirconium oxide and about 60-20% by weight antimony oxide is preferred.

Referring to the matter of fibrous reinforcement, it has been found that improved non-dripping and shape-retaining properties are obtained when the fibrous reinforcement is present in an amount of about 5 to 70 parts, preferably 5 to 50 parts by weight per 100 parts by weight of thermoplastic polyester. The fibrous reinforcing agent may be selected from the group consisting of glass fibers, asbestos, fibers, and gypsum fibers, silicate fibers and whiskers. Glass fibers and asbestos fibers are preferred. The combination of these is effective for improving the non-drip properties of the composition.

Flame-retarding polyester resins of this invention may further contain coloring agents such as dyes or pigments, or both, crystallizing agents, fillers, reinforcing agents, lubricants, plasticizers, heat-resistance agents, absorbers of ultraviolet rays, mold release agents, expanding agents, thickeners and coupling agents.

Blending of a zirconium compound, a halogenated aromatic compound and antimony trioxide with a thermoplastic polyester may be carried out by conventional methods at any time before molding.

The following examples are further illustrative of the present invention. As stated, the present invention is not intended to be limited to any of the specific features described in the examples, or other than as set forth in the appended claimed.

EXAMPLE 1

Polybutylene terephthalate (PBT) having an intrinsic viscosity of 1.26(o-chlorophenol sol. at 25° C) was mixed in a ratio as shown in Table 1 with decabromobiphenyl ether (DBE), antimony trioxide, zirconium oxide and 2 mm in length of chopped strand glass fiber. The blend was extruded at 250° C on a cylinder and nozzle, and at 40° C in a mold. The molded specimens were tested for tensile properties and flammability according to ASTM specification D-638 and UL-94 methods, respectively. The results, summarized in Table 1, show that zirconium oxide when added to the flame-retardant composition of glass reinforced PBT, prevents dripping of flaming particles, and that excellent mechanical properties are retained.

Table 1

| Run No. | | 1 | 2 | 3 | 4 | 5 | 6* |
|---|---|---|---|---|---|---|---|
| Composition (parts by weight) | PBT | 100 | 100 | 100 | 100 | 100 | 100 |
| | Glass Fiber | 40 | 40 | 40 | 45 | 50 | 40 |
| | DBE | 12 | 14 | 5 | 12 | 12 | 12 |
| | Antimony trioxide | 5 | 3 | 12 | 3 | 0 | 5 |
| | Zirconium dioxide | 3 | 8 | 6 | 8 | 10 | 0 |
| Flammability | 1/16" | V-0(ND) | V-0(ND) | V-0(ND) | V-0(ND) | V-1(ND) | V-0(D) |
| | 1/8" | V-0(ND) | V-0(ND) | V-0(ND) | V-0(ND) | V-0(ND) | V-0(D) |
| Mechanical Properties | Tensile Strength (kg/cm$^2$) | 1867 | 1865 | 1980 | 2059 | 2230 | 1780 |
| | Tensile Elongation | 3.2 | 4.1 | 3.0 | 2.8 | 3.1 | 3.2 |

Table 1-continued

| Run No. | 1 | 2 | 3 | 4 | 5 | 6* |
|---------|---|---|---|---|---|----|
| (%)     |   |   |   |   |   |    |

Wherein*: as comparison
V-0(ND): Fulfilled rating V-0 of UL Standards without any dripping
V-0(ND): Fulfilled rating V-0 of UL Standards with dripping

EXAMPLE 2

One hundred parts of PBT having an intrinsic viscosity of 1.30(o-chlorophenol sol. at 25° C) were blended with 40 parts of glass fiber, 20 parts of tetrabromobisphenol A and 5 parts of an additive as shown in Table 2. Following the procedure of example 1, the molded specimens for UL-94 flammability tests were molded. The results, as shown in Table 2, demonstrate that the addition of zirconium oxide to glass-reinforced flame-retardant PBT is particularly effective to prevent the dripping of flaming particles during burning.

Table 3. The dry blends were extruded into pellets in the same manner as Example 1. The pellets were molded into 8 cm × 8 cm × 2 mm test pieces and were subjected to the flaming test for flyback transformers, described in Denki Seihin Torishimari Ho of Japan (Law for Regulation of Electric Products), a testing method quite similar to the 94-5V rating test of UL Standards. The results, shown in Table 3, demonstrate that zirconium oxide has a surprisingly beneficial, cooperative effect on shape retention of the molded articles during burning in combination with fibrous reinforcement.

Table 3

| Run No. | | 12 | 13 | 14 | 15* | 16* | 17* |
|---|---|---|---|---|---|---|---|
| Composition (Parts by weight) | PBT | 100 | 100 | 100 | 100 | 100 | 100 |
| | Glass Fiber | 40 | 30 | 40 | 40 | 30 | 40 |
| | Asbestos Fiber | 0 | 5 | 0 | 0 | 5 | 0 |
| | Polytetrafluoroethylene | 0 | 0 | 5 | 0 | 0 | 5 |
| | DBE | 14 | 14 | 14 | 14 | 14 | 14 |
| | Antimony oxide | 4 | 4 | 4 | 4 | 4 | 4 |
| | Zirconium dioxide | 5 | 5 | 5 | 0 | 0 | 0 |
| Flammability | Flaming (sec) | 1 | 0 | 1 | 5 | 3 | 3 |
| | Shape Retention | ND | ND | ND | D | D | D |

Wherein *: Compared example
Flaming: average flaming time for one application of flame
ND: No deformation of specimens was observed while burning
D: Deformation or dripping out of specimens was observed while burning

Table 2

| Run No. | Additive | Flammability (1/16" thick sample) |
|---------|----------|-----------------------------------|
| 7*  | none             | V-2      |
| 8   | Zirconium dioxide| V-0(ND)  |
| 9*  | Zinc oxide       | V-0(D)   |
| 10* | Talc             | V-2      |
| 11* | Titanium oxide   | V-2      |

Wherein *: control example

EXAMPLE 4

The compositions described in Table 4 were melt-blended and molded into test specimens for tensile properties and flammability in a manner similar to Example 1. The results, shown in Table 4, indicate zirconium oxide to be surprisingly effective in preventing dripping of flaming particles.

Table 4

| Run No. | | 18 | 19 | 20 | 21 | 22 | 23 | 24* |
|---|---|---|---|---|---|---|---|---|
| Composition (Parts by Weight) | PBT | 100 | 100 | 100 | 100 | 100 | 100 | 100 |
| | Glass Fiber | 40 | 40 | 40 | 40 | 0 | 0 | 0 |
| | DBE | 12 | 12 | 12 | 12 | 14 | 14 | 12 |
| | Antimony oxide | 3 | 0 | 0 | 2 | 0 | 4 | 2 |
| | "Fire DTC-100"** | 0 | 10 | 0 | 5 | 0 | 0 | 0 |
| | "Fire DTC-200"** | 0 | 0 | 8 | 0 | 8 | 4 | 0 |
| Flammability | 1/16" | V-0(ND) | V-0(ND) | V-0(ND) | V-0(ND) | V-0(D) | V-0(D) | V-2 |
| | 1/8" | V-0(ND) | V-0(ND) | V-0(ND) | V-0(ND) | V-0(ND) | V-0(ND) | V-2 |
| Mechanical Property | Tensile Strength (kg/cm$^2$) | 1750 | 1810 | 1805 | 1765 | 523 | 603 | 615 |
| | Tensile Elongation (%) | 3.0 | 2.8 | 3.2 | 3.3 | 8.9 | 23 | 10 |

Wherein "Flame Cut": Calcination product from soluble zirconate
"Fire DTC-100": A solid solution of zirconium oxide and antimony oxide (80 to 20) by weight
"Fire DTC-200": A solid solution of zirconium oxide and antimony oxide (70 to 30) by weight
*: as control
**: Trade name of Dai Ichi Kigenso Co.

V-2: Fulfilled rating V-2 of UL Standards
V-0(NO): Fulfilled rating V-0 of UL Standards without any dripping
V-0(D): Fulfilled rating of UL Standards with dripping

EXAMPLE 3

One hundred parts of PBT having intrinsic viscosity of 1.32(o-chlorophenol) were mixed with 40 parts of glass fiber, 20 parts of DBE, 4 parts of antimony trioxide and various amounts of additives, as described in

EXAMPLE 5

The same runs as in Example 1 were carried out except various halogenated aromatic compounds were used instead of decabromobiphenyl ether. The compositions were prepared as follows:

| Ingredients | Parts by Weight |
|---|---|
| PBT (intrinsic viscosity 1.30) | 100 |
| Glass fibers (3mm length) | 40 |
| Halogenated aromatic compound | 17 |
| Antimony trioxide | 5 |
| Zirconium dioxide | 3 |
| Asbestos fiber | 3 |

The results are summarized in Table 5.

Table 5

| Run No. | Halogenated Aromatic Compound | Flammability (1/32" thick sample) |
|---|---|---|
| 25 | Hexabromobiphenyl | V-O(ND) |
| 26 | Hexabromobiphenylether | V-O(ND) |
| 27 | Bis-glycidylether of tetrabromo-bis-phenol A | V-O(ND) |
| 28 | Polycarbonate oligomer of tetrabromo-bis-phenol A | V-O(ND) |

EXAMPLE 6

Similar runs as described in Example 1 were carried out, except that various thermoplastic polyesters were used instead of polybutylene terephthalate. The compositions were prepared as follows:

| Polyester | 100 parts by weight |
|---|---|
| Decabromobiphenyl | 12 parts |
| "Fire DTC-200"** | 12 parts |

**"Fire DTC-200": A solid solution of 30% antimonytrioxide and 70% zirconium oxide by weight (Trade name of Daiichi Kigenso Co., Japan)

**"Fire DTC-200": A solid solution of 30% antimonytrioxide and 70% zirconium oxide by weight (Trade name of Daiichi Kigenso Co., Japan)

From these examples it can be seen that various kinds of flame retardant thermoplastic polyesters were improved as to the non-dripping of flaming particles by the addition of zirconium oxide.

Table 6

| Run No. | Polyester | Flammability (⅛" thick sample) |
|---|---|---|
| 29 | PET | V-O(ND) |
| 30 | PEN | V-O(ND) |
| 31 | PHT | V-O(ND) |
| 32* | PET | V-O(D) |

Wherein PET :Polyethylene terephthalate
PEN :Polyethylene 2,6-naphthalate
PHT :Polyhexamethylene terephthalate
* :Antimony trioxide is employed instead of "Fire DTC-200"** as comparison

What we claim is:

1. A flame-retardant, non-dripping, shape-retaining thermoplastic polyester resin comprising about 100 parts by weight of a linear polyester, about 5 to 25 parts by weight of a halogenated aromatic compound, about 1 to 20 parts by weight of antimony trioxide, and about 1 to 20 parts by weight of a zirconium compound containing a substantial and effective proportion of zirconium oxide.

2. A flame-retardant, non-dripping, shape-retaining thermoplastic polyester resin of claim 1, wherein the zirconium compound is selected from the group consisting of zirconium oxide and the calcination products of zirconium hydroxide, ammonium zirconate, titanium zirconate, calcium zirconate and zinc zirconate.

3. A flame-retardant, non-dripping, shape-retaining thermoplastic polyester resin of claim 1, wherein the zirconium compound consists essentially of zirconium dioxide.

4. A flame-retardant, non-dripping, shape-retaining thermoplastic polyester resin of claim 1, wherein the amount of the zirconium compound is about 3 to 15% by weight, based upon the weight of the polyester.

5. A flame-retardant, thermoplastic polyester resin of claim 1, wherein the zirconium compound and the antimony trioxide are present in the form of a solid-solution.

6. A flame-retardant, non-dripping, shape-retaining thermoplastic polyester resin of claim 1, containing up to 70 parts by weight of a fibrous reinforcing agent.

7. A flame-retardant, non-dripping, shape-retaining thermoplastic polyester resin of claim 6, wherein the amount of the fibrous reinforcing agent is about 5 to 50 parts by weight.

8. A flame-retardant, non-dripping, shape-retaining thermoplastic polyester resin of claim 6, wherein the fibrous reinforcing agent is selected from the group consisting of glass fibers and abestos fibers.

9. A flame-retardant, non-dripping, shape-retaining thermoplastic polyester resin of claim 1, further containing up to 70 parts by weight of a fibrous reinforcing agents.

10. A flame-retardant, thermoplastic polyester resin of claim 4, wherein the amount of the fibrous reinforcing agent is about 5 to 50 parts by weight.

11. A flame-retardant, thermoplastic polyester resin of claim 6, wherein the fibrous reinforcing agent is selected from the group consisting of glass fibers and abestos fibers.

12. The flame-retardant, thermoplastic polyester resin of claim 1, wherein said zirconium compound contains about 60 to 100% zirconium dioxide.

* * * * *